(12) United States Patent
Wu

(10) Patent No.: US 12,196,307 B2
(45) Date of Patent: Jan. 14, 2025

(54) GEAR UNIT HAVING A SHAFT, A FIRST BEARING, A HOUSING PART, AND A COVER

(71) Applicant: SEW-EURODRIVE GMBH & CO. KG, Bruchsal (DE)

(72) Inventor: Zili Wu, Tianjin (CN)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 140 days.

(21) Appl. No.: 18/013,961

(22) PCT Filed: Jun. 9, 2021

(86) PCT No.: PCT/EP2021/025203
§ 371 (c)(1),
(2) Date: Dec. 30, 2022

(87) PCT Pub. No.: WO2022/002432
PCT Pub. Date: Jan. 6, 2022

(65) Prior Publication Data
US 2023/0296167 A1     Sep. 21, 2023

(30) Foreign Application Priority Data

Jul. 1, 2020 (CN) .......................... 202010621077.6
Jul. 22, 2020 (DE) .......................... 102020004407.7

(51) Int. Cl.
*F16H 57/022* (2012.01)
*F16H 57/029* (2012.01)
(Continued)

(52) U.S. Cl.
CPC ......... *F16H 57/022* (2013.01); *F16H 57/029* (2013.01); *F16H 57/031* (2013.01);
(Continued)

(58) Field of Classification Search
CPC .............. F16H 57/031; F16H 57/0408; F16H 2057/0221
See application file for complete search history.

(56) References Cited

U.S. PATENT DOCUMENTS 2,989,888 A * 6/1961 Brock .................. F16C 35/067
411/548
3,454,313 A * 7/1969 Lohneis ................ F16C 19/525
403/30
(Continued)

FOREIGN PATENT DOCUMENTS

CN          203685659 U     7/2014
CN          106641203 A     5/2017
(Continued)

OTHER PUBLICATIONS

USPTO Machine Translation (retrieved from FIT database) of the Description of CN 206889640 U, Ma et al., Jan. 16, 2018. (Year: 2024).*

(Continued)

*Primary Examiner* — Daniel D Yabut
(74) *Attorney, Agent, or Firm* — Carter, DeLuca & Farrell LLP

(57) ABSTRACT

A gear unit includes a shaft, rotatably mounted via a first bearing, a housing part, and a cover connected to the housing part. The shaft has a threaded region onto which a nut is screwed, and a spacing sleeve and a disk are arranged between the nut and an inner ring of the spacing sleeve. The greatest outer diameter of the disk is greater than the greatest outer diameter of the spacing sleeve; the greatest radial distance of the disk relative to the rotational axis of the shaft is greater than the greatest radial distance of the spacing sleeve relative to the rotational axis of the shaft; and/or the radial spacing region covered by the disk and relative to the rotational axis of the shaft contains the radial spacing region covered by the spacing sleeve.

25 Claims, 1 Drawing Sheet

(51) Int. Cl.
*F16H 57/031* (2012.01)
*F16H 57/04* (2010.01)

(52) U.S. Cl.
CPC ..... *F16H 57/0408* (2013.01); *F16H 57/0424* (2013.01); *F16H 57/0452* (2013.01); *F16H 57/0471* (2013.01); *F16H 2057/0221* (2013.01)

(56) References Cited

U.S. PATENT DOCUMENTS

| | | | | |
|---|---|---|---|---|
| 4,817,846 | A * | 4/1989 | Eichinger | F16H 57/04 277/377 |
| 6,409,390 | B1 * | 6/2002 | Bouzakis | F16C 25/083 384/537 |
| 2008/0153683 | A1 * | 6/2008 | Kirkpatrick | F16C 35/06 384/537 |

FOREIGN PATENT DOCUMENTS

| | | | |
|---|---|---|---|
| CN | 206889640 U | 1/2018 | |
| CN | 207111896 U | 3/2018 | |
| CN | 207278846 U | 4/2018 | |
| DE | 2923507 A1 | 1/1980 | |
| WO | 2015185484 A1 | 12/2015 | |
| WO | WO-2017016665 A1 * | 2/2017 | ........... F16H 57/031 |
| WO | 2020/192964 A1 | 10/2020 | |

OTHER PUBLICATIONS

International Report on Patentability issued in corresponding International Application No. PCT/EP2021/025203 dated Dec. 13, 2022, pp. 1-9, English Translation.

International Search Report issued in corresponding International Application No. PCT/EP2021/025203 dated Jan. 20, 2022, pp. 1-2, English Translation.

* cited by examiner

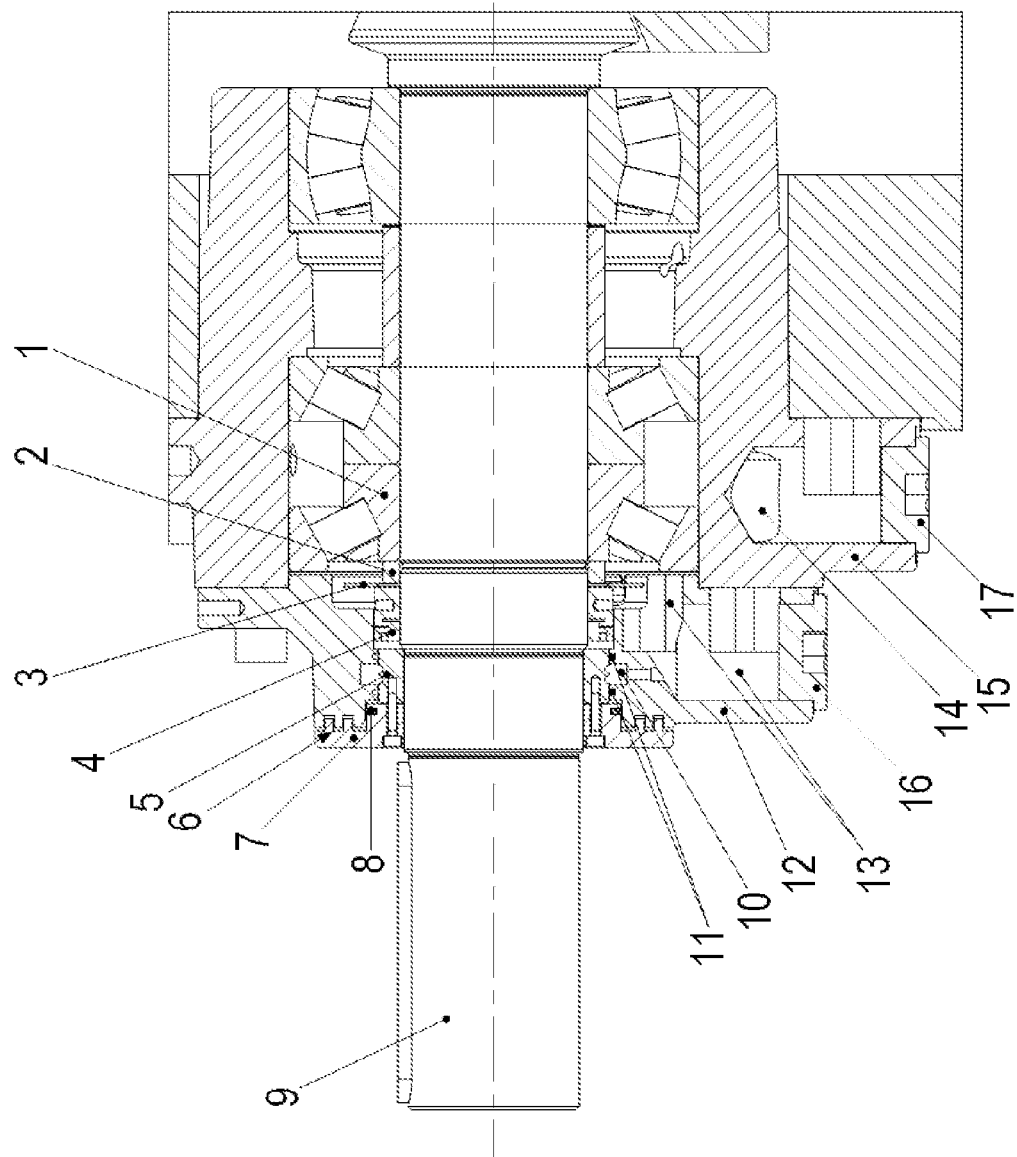

GEAR UNIT HAVING A SHAFT, A FIRST BEARING, A HOUSING PART, AND A COVER

FIELD OF THE INVENTION

The present invention relates to a gear unit having a shaft, a first bearing, a housing part, and a cover.

BACKGROUND INFORMATION

Chinese Patent Document No. 207278845 describes a gear unit, in which a shaft is rotatably mounted in a bearing received in a housing part of the gear unit.

A device in pulping apparatus for material containing lignocellulose is known described in German Patent Document No. 29 23 507.

A device for lubricating a roller bearing of an electric motor is described in PCT Patent Document No. WO 2015/185484.

A sealing arrangement for a rotatably-mounted shaft of a gear unit is described in Chinese Patent Document No. 106641203.

SUMMARY

Example embodiments of the present invention provide a gear unit in an environmentally friendly manner.

According to example embodiments, a gear unit includes a shaft, at least one first bearing, a housing part, and a cover. The shaft is rotatably mounted via the first bearing, the first bearing has an inner ring fitted onto the shaft, the cover is connected to the housing part, e.g., by screws, the shaft has a threaded region onto which a nut is screwed, e.g., for adjusting bearing tension, and a spacing sleeve and a disk are arranged between the nut and the inner ring. The greatest outer diameter of the disk is greater than the greatest outer diameter of the spacing sleeve, the greatest radial distance of the disk relative to the rotational axis of the shaft is greater than the greatest radial distance of the spacing sleeve relative to the rotational axis of the shaft, and/or the radial spacing region covered by the disk and relative to the rotational axis of the shaft contains the radial spacing region covered by the spacing sleeve.

For example, frictionless sealing of the output side of the gear unit is made possible. Thus, the gear unit can be provided with lower power loss, which spares resources, e.g., energy consumption, and protects the environment. In addition, oil is prevented from escaping, which also protects and preserves the environment. This is because the disk prevents oil escaping from the first bearing in the direction of the shaft from spreading, on the one hand, so that outflow through the channel is effected, and in addition the disk prevents oil adhering adhesively to the shaft from flowing out to the output side, because, when there is a rotational movement of the shaft and thus also a rotational movement of the disk connected rotation-fast to the shaft, the disk acts as a centrifugal edge and spins the oil off such that the oil that has spun off is conducted along the inner wall of the cover to the channel and from there is returned to the oil pan. When not rotating, the disk acts as a drip edge and thus also causes the oil to travel to the channel and thus to return to the oil pan.

Therefore, energy and material emissions reduced or prevented, which protects the environment.

The interposition of a spacing sleeve between the disk and the inner ring of the first bearing makes it possible for the disk to be arranged very narrow, that is, with low mass and thus low moment of inertia, and the spacing sleeve with a very small outer diameter. This makes it possible for the oil flowing out of the first bearing to collect in the region axially between the disk and the inner ring and then to flow out of this annular region to the oil pan of the inner region via the channel.

Thus, the bearing tension is generated and/or fixed by the nut screwed onto the shaft, and the disk is clamped in when the bearing tension is generated. In other words, not only is the bearing tension generated when the nut is screwed onto the shaft, but the attaching force for the disk is also generated. When the bearing tension is elevated, the disk is also held more tightly than when the bearing tension is lower.

True containment is understood to be containment as a true partial quantity. Thus, the radial distance region covered by the spacing sleeve is a true partial quantity of the radial distance region covered by the disk relative to the rotational axis of the shaft.

According to example embodiments, the disk is arranged axially between the nut and the spacing sleeve. Thus, the nut presses directly onto the disk and the latter further transmits the force onto the inner ring via the spacing sleeve.

According to example embodiments, the spacing sleeve rests against the inner ring of the first bearing. Thus, pressure is exerted onto the inner ring substantially only axially.

According to example embodiments, the spacing sleeve is arranged axially between the disk and the inner ring of the first bearing. Thus, the oil collects in the axial region covered by the spacing sleeve and then flows off via the channel.

According to example embodiments, the bearing tension of the bearing arrangement of the shaft having the first bearing is adjusted by the nut. For example, the bearing arrangement has a second bearing. Thus, the bearing tension provided in the bearing can be adjusted by the nut screwed onto the shaft. The nut, for example, has a device for non-positive fit tensioning of the nut on the threaded region of the shaft. This prevents the nut from being screwed back and means the bearing tension can be fixed. To this end, on its outer side and on its inner side the nut has slits and/or grooves, so that axially oriented screws passed therethrough press regions of the nut towards one another and thus effect the fixation-producing tensioning of the nut on the screw thread.

According to example embodiments, the disk projects into an annular space that is connected via a channel to an inner space of the gear unit, e.g., to an inner space of the gear unit including a toothed part and an oil pan of the gear unit. Thus, oil escaping from the first bearing is diverted and conducted back into the oil pan. Because the oil flowing through the channel thereby flows along the cover, the cover can be cooled and thus also parts connected to the cover can be cooled.

According to example embodiments, the annular space is limited by the first bearing, e.g., by the inner ring, the roller bodies, and the outer ring of the first bearing, and by the nut, the disk, the spacing sleeve, and the cover. Thus, simple production is made possible in that a recess is formed on the cover.

According to example embodiments, the channel includes: a first space, e.g., a recess, limited by the cover, a drain plug, and the housing part; and a second space that passes through the housing part and opens on one hand into the inner space of the gear unit and on the other hand into the first space. For example, the first space opens into the annular space. Thus, simple production is made possible using suitable forming of the cover and housing part.

According to example embodiments, an annular gap is arranged between the nut and the cover. For example, the nut is connected rotatably-fixed to the shaft. Thus, the nut is connected rotatably-fixed to the shaft and the cover is connected rotatably-fixed to the housing part.

According to example embodiments, a ring is fitted onto the shaft and is connected to the shaft in a non-positive fit, e.g., using thermal shrinking. The nut is arranged axially, that is, for example, in the axial direction and/or, that is, in the direction of the rotational axis of the shaft, between the ring and the first bearing. Thus, it is possible to connect the ring oil-tight to the shaft in a simple manner.

According to example embodiments, a labyrinth disk is connected, e.g., by screws, to the ring. For example, the circumferential annular grooves of which, oriented coaxially with the rotational axis of the shaft, together with corresponding circumferential annular grooves added to the cover and oriented coaxially with the rotational axis of the shaft, form a labyrinth gap. Thus, security against escaping oil is increased. Thus, environmental protection, that is, the protection of the environment of a gear unit against the emission of noise, energy, or substances, e.g., oil, is improved.

According to example embodiments, a main chamber and two chambers spaced apart from the main chamber are arranged between the ring and the cover. The main chamber is arranged axially between the two chambers, and an annular gap connecting the main chamber to the two chambers is arranged between the ring and the cover. Thus, a reduction in pressure can be achieved.

According to example embodiments, an elevation, e.g., a local maximum of the outer diameter of the ring that depends on the axial position, is arranged on the ring. The elevation projects into the main chamber, and, for example, the axial region covered by the main chamber includes and/or truly contains the axial region covered by the elevation. Thus, it is made possible that any escaping quantities of oil spin off. In doing so, the main chamber is itself connected to the channel, so that this spun-off oil is also returned to the oil pan. This also improves environmental protection.

According to example embodiments, a laminar ring is arranged between the labyrinth seal and the ring. Thus, a further improved seal is created. Thus, this also improves environmental protection. The seal is thus constructed by layer. Oil that unexpectedly overcomes the disk axially to the output is spun off at least at the elevation in the main chamber. If, unexpectedly, this does not occur, the oil is held back by the laminar ring and if this is also not the case it is held back by the labyrinth seal.

According to example embodiments, the radial wall thickness of the nut is greater than the radial wall thickness of the spacing sleeve. Thus, material is saved, and the region for diverting the oil is arranged as large as possible.

According to example embodiments, the laminar ring, which, for example, includes three pieces, is arranged in a circumferential annular groove of the labyrinth disk. For example, the radially outer surface of the laminar ring contacts the cover. Thus, a particularly effective seal can be achieved. Thus, environmental protection is improved.

According to example embodiments, at least one screw is guided through the labyrinth disk and screwed into a threaded hole of the ring. The region covered axially by the screw overlaps with the region covered axially by the main chamber, and, for example, the head of the screw presses the labyrinth disk to the cover. Thus, the screw can be formed from a material of lower density than the material of the ring. Thus, a lower moment of inertia can be achieved than with a shorter screw and threaded hole.

Further features and aspects of example embodiments of the present invention are explained in greater detail below with reference to the appended schematic Figure.

BRIEF DESCRIPTION OF THE DRAWING

FIG. 1 is a longitudinal cross-sectional view of a region of a gear unit according to an example embodiment of the present invention.

DETAILED DESCRIPTION

As illustrated in FIG. 1, a shaft 9, e.g., a solid shaft or hollow shaft, is mounted via bearings received in a housing part 15.

The shaft 9 is, for example, arranged as the drive shaft of the gear unit and projects out of the housing including the housing part 15.

The inner ring 1 of a first of the bearings is fitted onto the shaft and is connected in a non-positive fit to the shaft 15.

The bearings are arranged embodied as angular contact bearings, e.g., as double bearings or double row bearings.

For adjusting the bearing tension, a nut 4 is screwed onto the shaft 9 and presses against the inner ring 1 via a spacing sleeve 2 fitted onto the shaft 9 and arranged axially between the inner ring 1 of the first bearing and the nut 4, and a disk 3, also fitted onto the shaft 9 and arranged between the nut 4 and the spacing sleeve 2, thus effecting the bearing tension.

The disk 3 extends further radially than the nut 4 and the spacing sleeve 2. The disk 3 thus covers a radial distance region that contains the radial distance region covered by the nut 4, and/or the disk 3 thus covers a radial distance region that contains the radial distance region covered by the spacing sleeve. The fact that the disk 3 projects radially prevents the oil lubricating the roller bodies from flowing from the inner ring 1 to the nut 4.

The nut 4 can be arranged as a tightening nut, in which, on its radial outside and on its radial inside, it has at least one circumferential groove and/or slit, and screws that press regions spaced apart from one another axially toward one another through the groove or slit. Thus, a detent or fixation is made possible at the screw threaded region of the shaft 9 where the nut 4 is screwed on.

For covering the first bearing, a cover 12 is connected to the housing part 15. The radial distance region covered by the cover 12 contains the radial distance region covered by the first bearing, that is, for example, its outer ring, roller bodies, and inner ring 1.

The cover 12 is tightly connected to the housing part 15 by screws and a seal, e.g., a flat seal and/or O-ring.

The radial distance, the axial direction, and the circumferential direction refer to the rotational axis of the shaft 9.

The disk 3 projects radially into a recess of the cover 12, which recess is limited by the cover 12, the spacing sleeve 2, the housing part 15, and the first bearing, e.g., by the inner ring 1, the outer ring, and the roller bodies of the first bearing.

The oil escaping from the first bearing enters into this chamber-like recess and is returned via a channel to the oil pan of the gear unit. The channel is made of a recess 13 made in the cover 12, e.g., from the underside of the cover 12 into the cover 12, and, on the other hand, in a recess 14 made in the housing part 15. This recess 14 passes through the housing part and thus opens into the interior of the gear unit, e.g., such that the oil can be returned to the oil pan of the gear unit.

A drain plug screwed into a threaded hole of the housing part 15 passing through the housing part 15 from the surroundings closes the recess 14 to the surroundings.

A drain plug screwed into a threaded hole of the cover 12 passing through the cover 12 closes the recess 13 to the surroundings. Thus, oil collecting in the recesses 13 and 14 can be readily drained during maintenance.

The disk 3 is clamped between the nut 4 and the spacing sleeve 2. Since the disk 3 projects radially on the spacing sleeve and is arranged on the side of the spacing sleeve 2 facing away from the first bearing, the oil escaping from the first bearing is stopped by the nut 4 and diverted to the oil pan via the channel leading downward.

Like the nut 4 and the spacing sleeve 2, the disk 3 is connected rotationally-fixed to the shaft 9. Thus, any oil remaining on the disk 3 is spun off, e.g., as a result of the centrifugal force.

There is a narrow gap between the nut 4 and the housing part 12. However, a labyrinth seal 6 and a laminar ring 8 are arranged to the output side for sealing. In addition, a ring 5 is arranged between these seals and the nut 4.

This ring 5 has an annular groove, the groove bottom of which has an elevation oriented radially outward. This annular groove is thus produced such that the groove depth has a local minimum axially. In this manner, oil is permitted to spin off, since the elevation functions as a centrifugal edge. The oil spun off is spun into a main chamber 10 formed extending circumferentially in that a circumferential inner groove is added to the cover 12.

A further inner groove is arranged axially before and after this inner groove, so that corresponding chambers 11 are formed that are limited respectively by the cover 12 and the shaft 9. These chambers 11 are for reducing pressure.

On its end region facing the drain plug 16, the main chamber 10 is connected to the channel in that a recess passing through the cover 12 opens on the one hand into the recess 13 and on the other hand into the main chamber 10. This recess is, for example, arranged as a stepped bore, e.g., a radially oriented stepped bore.

The main chamber 10 together with the chambers 11 are arranged axially between the laminar ring 8 and the nut 4.

The labyrinth seal is formed from the cover 12 and the labyrinth disk 7. The labyrinth disk 7 has circumferential annular grooves concentric with the rotational axis of the shaft 9 and spaced apart from one another. These annular grooves are open to the cover 12. A labyrinth seal is formed by corresponding circumferential annular grooves arranged on the cover 12 that are concentric with the rotational axis of the shaft and spaced apart from one another. The labyrinth seal extends radially. This is because the annular grooves of the cover 12 each cover the same axial region. Likewise, the annular grooves formed on the labyrinth disk 7 each cover an identical further axial region, which however overlaps with the axial region covered by the annular grooves of the cover 12.

The laminar ring 8, for example, including three pieces, is arranged in a circumferential annular groove of the labyrinth disk 7. The radially outer surface of the laminar ring 8 contacts the cover 12.

The ring 5 is fitted onto and/or connected to the shaft 9 in a non-positive fit. To this end, a temperature difference is effected during production and the ring 5 is fitted on with this temperature difference. The ring 5 is connected to the shaft 9 in a non-positive fit using this shrinking.

The labyrinth disk 7 is connected to the ring 5 by screws. To this end, the threaded region of each screw is screwed into the respective threaded holes of the cover 12, and the screw head of each screw projecting through the labyrinth disk 7 presses the labyrinth disk 7 against the cover 12. The threaded holes and screws are, for example, oriented axially.

The cover 12 is attached to the housing part 15 by screws.

Together the chambers 11 have a smaller volume than the main chamber 10.

The chambers 11 are each formed by a circumferential groove, e.g., an inner groove, added to the cover 12. The main chamber 10, on the other hand, is formed by a circumferential annular groove that has the elevation and that is added to the shaft 9, and by a further circumferential groove, e.g., an inner groove, added to the cover 12. The region covered axially by the further groove includes the region covered axially by the annular groove added to the shaft 9.

In exemplary embodiments, the bearings are not arranged as angular contact bearings, but rather as roller bearings or even as other rolling bearings that are lubricated by oil from the interior of the gear unit.

LIST OF REFERENCE NUMERALS

1 Inner ring of the first bearing
2 Spacing sleeve
3 Disk
4 Nut, e.g., tightening nut
5 Ring
6 Labyrinth seal
7 Labyrinth disk
8 Laminar ring
9 Shaft, e.g., solid shaft or hollow shaft
10 Main chamber
11 Chamber
12 Cover
13 Recess in the cover 12
14 Recess in the housing part 15
15 Housing part
16 Drain plug
17 Drain plug

The invention claimed is:

1. A gear unit, comprising:
a first bearing having an inner ring;
a shaft rotatably mounted via the first bearing and including a threaded region, the inner ring of the first bearing being arranged on the shaft;
a nut engaged with the threaded region of the shaft;
a housing part;
a cover connected to the housing part;
a spacing sleeve; and
a disk;
wherein the spacing sleeve and the disk are arranged between the nut and an inner ring of the first bearing;
wherein a greatest outer diameter of the disk is greater than a greatest outer diameter of the spacing sleeve, a greatest radial distance of the disk relative to a rotational axis of the shaft is greater than a greatest radial distance of the spacing sleeve relative to the rotational axis of the shaft, and/or a radial spacing region covered by the disk and relative to the rotational axis of the shaft contains a radial spacing region covered by the spacing sleeve; and
wherein a first axial side of the nut abuts a first axial side of the disk, a second axial side of the disk arranged axially opposite to the first axial side of the disk abuts a first axial side of the spacing sleeve, and a second axial side of the spacing sleeve arranged axially opposite to the first axial side of the spacing sleeve abuts a first axial side of the inner ring of the first bearing.

2. The gear unit according to claim 1, wherein the cover is screw-connected to the housing part, and the nut is adapted to adjust a bearing tension.

3. The gear unit according to claim 1, wherein the disk is arranged axially between the nut and the spacing sleeve.

4. The gear unit according to claim 1, wherein the spacing sleeve rests against the inner ring of the first bearing, and/or the spacing sleeve is arranged axially between the disk and the inner ring of the first bearing.

5. The gear unit according to claim 1, wherein the nut is adapted to adjust a bearing tension of a bearing arrangement of the shaft having the first bearing.

6. The gear unit according to claim 5, wherein the bearing arrangement includes a second bearing.

7. The gear unit according to claim 1, wherein the disk projects into an annular space that is connected via a channel to an inner space of the gear unit and/or to an inner space of the gear unit that includes a toothed part and an oil pan of the gear unit.

8. The gear unit according to claim 7, wherein the annular space is limited by (a) the first bearing and/or (b) an inner ring, roller bodies, and an outer ring of the first bearing, and by the nut, the disk, the spacing sleeve, and the cover.

9. The gear unit according to claim 7, wherein the channel includes (a) a first space limited by the cover, a drain plug, and the housing part, and (b) a second space that passes through the housing part and opens into the inner space of the gear unit and into the first space.

10. The gear unit according to claim 9, wherein the first space is arranged as a recess, and the first space opens into the annular space.

11. The gear unit according to claim 1, wherein an annular gap is arranged between the nut and the cover.

12. The gear unit according to claim 11, wherein the nut is rotationally-fixedly connected to the shaft.

13. The gear unit according to claim 1, wherein a ring is arranged on the shaft and connected to the shaft in a non-positive fit connection, and the nut is arranged axially between the ring and the first bearing.

14. The gear unit according to claim 13, wherein a labyrinth disk is connected to the ring.

15. The gear unit according to claim 14, wherein circumferential annular grooves of the labyrinth disk, oriented coaxially with a rotational axis of the shaft, together with corresponding circumferential annular grooves provided on the cover and oriented coaxially with the rotational axis of the shaft, form a labyrinth gap.

16. The gear unit according to claim 14, wherein a laminar ring is arranged between the labyrinth seal and the ring, and/or a radial wall thickness of the nut is greater than a radial wall thickness of the spacing sleeve.

17. The gear unit according to claim 16, wherein the laminar ring is arranged in a circumferential annular groove of the labyrinth disk.

18. The gear unit according to claim 17, wherein the laminar ring is formed of three pieces, and a radially outer surface of the laminar ring contacts the cover.

19. The gear unit according to claim 13, wherein a main chamber and two chambers spaced apart from the main chamber are arranged between the ring and the cover, the main chamber being arranged axially between the two chambers, an annular gap connecting the main chamber to the two chambers being arranged between the ring and the cover.

20. The gear unit according to claim 19, an elevation is arranged on the ring and projects into the main chamber.

21. The gear unit according to claim 20, wherein the elevation is arranged as a local maximum of an outer diameter of the ring that depends on an axial position, and an axial region covered by the main chamber includes an axial region covered by the elevation.

22. The gear unit according to claim 13, wherein the ring is connected to the shaft in a thermally-shrunk connection.

23. The gear unit according to claim 13, wherein a labyrinth disk is screw-connected to the ring.

24. A gear, comprising:
a first bearing having an inner ring;
a shaft rotatably mounted via the first bearing and including a threaded region, the inner ring of the first bearing being arranged on the shaft;
a nut engaged with the threaded region of the shaft;
a housing part;
a cover connected to the housing part;
a spacing sleeve; and
a disk;
wherein the spacing sleeve and the disk are arranged between the nut and an inner ring of the spacing sleeve;
wherein a greatest outer diameter of the disk is greater than a greatest outer diameter of the spacing sleeve, a greatest radial distance of the disk relative to a rotational axis of the shaft is greater than a greatest radial distance of the spacing sleeve relative to the rotational axis of the shaft, and/or a radial spacing region covered by the disk and relative to the rotational axis of the shaft contains a radial spacing region covered by the spacing sleeve;
wherein a ring is arranged on the shaft and connected to the shaft in a non-positive fit connection, and the nut is arranged axially between the ring and the first bearing
wherein a labyrinth disk is connected to the ring; and
wherein at least one screw is arranged through the labyrinth disk and screwed into a threaded hole of the ring, a region covered axially by the screw overlaps with a region covered axially by a main chamber.

25. The gear unit according to claim 24, wherein a material of the screw has a lower density than a material of the ring, and/or a head of the screw presses the labyrinth disk to the cover.

* * * * *